United States Patent

Yamada et al.

[11] 3,975,085
[45] Aug. 17, 1976

[54] LIQUID CRYSTAL DISPLAY DEVICE WITH INTERDIGITAL ELECTRODES

[75] Inventors: Tatsuya Yamada; Toshihide Kawashima; Takashi Oozeki, all of Kawasaki, Japan

[73] Assignee: Tokyo Shibaura Electric Co., Ltd., Kawasaki, Japan

[22] Filed: Oct. 31, 1974

[21] Appl. No.: 519,652

[30] Foreign Application Priority Data
Oct. 31, 1973   Japan............... 48-122383

[52] U.S. Cl.................. 350/160 LC; 340/166 EL; 340/324 M
[51] Int. Cl.²........................................... G02F 1/13
[58] Field of Search........ 350/160 LC; 315/169 TV; 340/166 EL, 324 M

[56] References Cited
UNITED STATES PATENTS
3,774,989   11/1973   Takahashi................. 350/160 LC

OTHER PUBLICATIONS

Heidrich et al., *Switching of Nematic Liquid Crystals by Surface Waves*, IBM Tech. Discl., vol. 15, No. 1, June 1972, pp. 165–167.

*Primary Examiner*—Paul L. Gensler
*Attorney, Agent, or Firm*—Cushman, Darby & Cushman

[57] ABSTRACT

AC drive voltages out of phase with each other are applied to a pair of interdigital electrodes disposed opposite to each other and adjacent to a liquid crystal material. By the AC drive voltages displaced in phase from each other rotating electric fields are generated to cause liquid crystal molecules to be violently rotated or perturbed. As a result, a contrast as well as rise and fall characteristics can be improved.

10 Claims, 16 Drawing Figures

LIQUID CRYSTAL DISPLAY DEVICE WITH INTERDIGITAL ELECTRODES

This invention relates to a liquid crystal display device and in particular to a liquid crystal display device with interdigital electrodes.

Well known is a liquid crystal display device or such a sandwich construction that a liquid crystal material is sandwiched between a pair of glass substrates and a drive voltage is applied between transparent electrodes oppositely disposed on the glass substrates, respectively. With such a liquid crystal display device it is required that a spacing between opposite electrodes and thus a pair of opposite glass substrates be narrowed so as to lower a drive voltage. The spacing between the glass substrates is usually selected to have a value of 6 to 25 microns. It is however very difficult to maintain the spacing uniformly over the whole surface of the glass substrate. For this reason, there is the possibility that display characteristics such as contrast will locally differ. Furthermore, the display device of such sandwich construction is manufactured in a poor yield and at high cost with the resultant disadvantages.

A liquid display device with interdigital electrodes capable of improving the drawbacks of such a conventional liquid crystal display device is disclosed in an article entitled "Singular Electrooptical Characteristics of Liquid Crystal Display with Interdigital Electrodes" of "SID Symposium Digest of Technical Papers", pp 36 to 37, published in 1973 by the Society of Information Display in U.S.A. With such liquid crystal display device a first interdigital electrode consisting of first and second electrodes having a plurality of electrode fingers arranged in an interdigital fashion on the same plane is disposed on a first substrate which, together with a second substrate, sandwiches a liquid crystal material. On the second substrate is disposed a second interdigital electrode consisting of third and fourth electrodes having a plurality of electrode fingers arranged in an interdigital fashion on the same plane. The fingers of the first interdigital electrode intersect at an angle of 90° to the fingers of the second interdigital electrode. AC drive voltages are applied between the first and second electrodes and between the third and fourth electrodes. One of both the interdigital electrodes is connected in common and drive voltages of the same phase are apllied to both the interdigital electrodes. Since the interdigital electrode is formed on the same plane, the uniformity of spacing between the pair of glass substrates presents no relatively great problem as compared with the conventional display device of such the sandwich construction. With the liquid crystal display device with such interdigital electrodes the uniformity of electric field as well as the lowering of applied voltage is dependent upon the pitch of the electrode fingers. No serious technical problems are encountered in forming the width or spacing of the electrode fingers on the order of about 10 to 25 microns. It is to be noted that disposing the pair of interdigital electrodes opposite to each other is for the purpose of enhancing the scattering efficiency of the liquid crystal material.

With the above-mentioned liquid crystal display device with the interdigital electrodes, however, no greater difference from the conventional liquid crystal display device of sandwich type is observed from the standpoint of display characteristics and it is only possible to realize a contrast of about 30:1 as well as a response of a rise time from several tens of milliseconds to several hundred of milliseconds and a fall time from several hundred of milliseconds to several seconds.

It is accordingly the object of this invention to provide a liquid crystal display device with interdigital electrodes which is capable of prominently improving a contrast as well as a response.

The feature of the liquid crystal display device according to this invention resides in that AC drive voltages which are out of phase with each other are applied to a plurality of interdigital electrodes included in a display cell and arranged opposite to each other.

With the liquid crystal display device according to this invention rotating electric fields are generated due to an application of AC drive voltages out of phase with each other. This causes liquid crystal molecules to be violently rotated or perturbed, resulting in prominently improving a contrast as well as rise and fall time. Furthermore, according to this invention a desired gray scale or half tone display can be obtained by suitably selecting the phase difference of AC drive voltages.

This invention can be more fully understood from the following detailed description when taken in conjunction with the accompanying drawings, in which.

Figure 1:
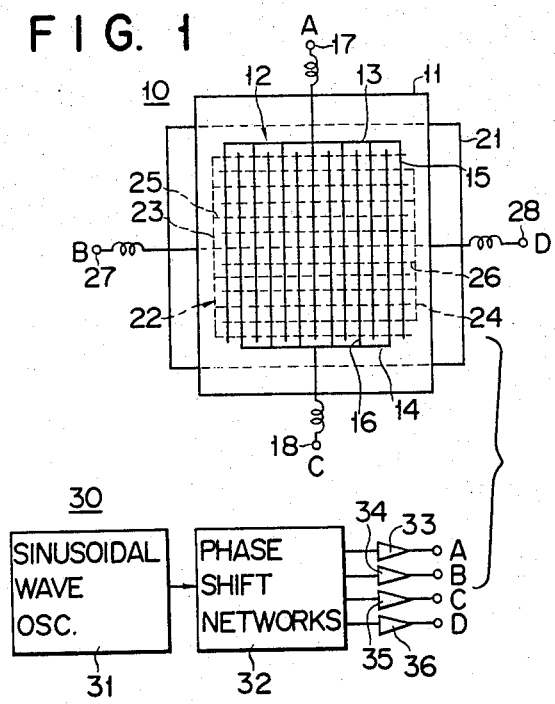
FIG. 1 shows a liquid crystal display device according to one embodiment of this invention including a display cell and a drive voltage source.

FIG. 1 shows schematically a liquid crystal display device according to one embodiment of this invention. In the figure, reference numerals 10 and 30 show a display cell and a driving voltage supply source, respectively. The display cell 10 has a pair of first and second glass substrates 11 and 21 between which a liquid crystal material is sandwiched. On the first glass substrate 11 is formed a first interdigital electrode 12 consisting of a pair of electrodes 13 and 14 having electrode fingers 15 and 16. The electrode fingers 15 and 16 of the electrodes 13 and 14 are arranged in an interdigital fashion as shown. On the second glass substrate 21 is formed a second interdigital electrode 22 consisting of a pair of electrodes 23 and 24 having electrode fingers 25 and 26, respectively. The electrode fingers 25 and 26 of electrodes 23 and 24 are arranged in an interdigital fashion. The fingers of the first interdigital electrode 12 and the fingers of the second interdigital electrode 22 are arranged at a predetermined angle, for example, 90° as shown to each other.

The first and second interdigital electrodes 12 and 22 are formed by photoetching a tin oxide film or a vapor deposited film such as indium oxide, gold etc.

The first and second electrodes 13 and 14 of the first interdigital electrode 12 are connected to supply terminals 17 and 18, respectively, while the first and second electrodes 23 and 24 of the second interdigital electrode 22 are connected to supply terminals 27 and 28, respectively.

Figure 2:
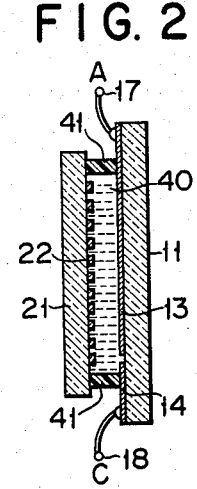
FIG. 2 is a side view in cross section showing the liquid crystal display cell of FIG. 1.

FIG. 2 shows the side cross sectional view of the display cell 10. In this figure, identical reference numerals are used to designate parts of elements corresponding to those shown in FIG. 1 and further explanation is therefore omitted. The liquid crystal material 40 sandwiched between the glass substrates 11 and 12 is sealed by a plastic rim 41.

To the supply terminals 17, 27, 18 and 28 of the liquid crystal display device according to this invention are applied from the driving voltage supply source 30 AC driving voltages A, B, C and D which are displaced in phase from each other. The driving voltage supply source 30 has a sinusoidal wave oscillator 31, phase shift networks 32 for phase shifting a sine wave of several kilohertz from the sinusoidal wave oscillator 31 to produce driving voltages A, B, C and D which is displaced in phase form each other, and amplifiers 33, 34, 35 and 36 for amplifying the driving voltages A, B, C and D to suitable levels.

Figure 3A:
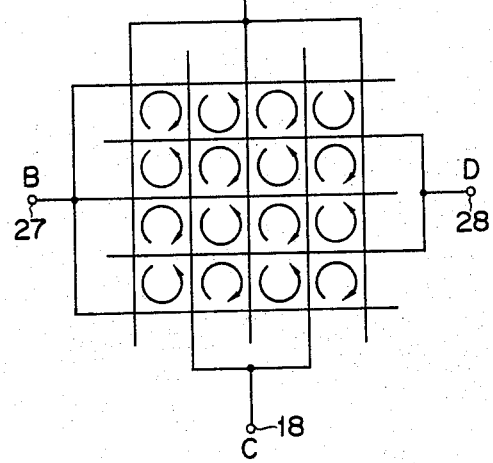
FIG. 3A is a view for explaining the operation of the display cell.
Figure 3B:
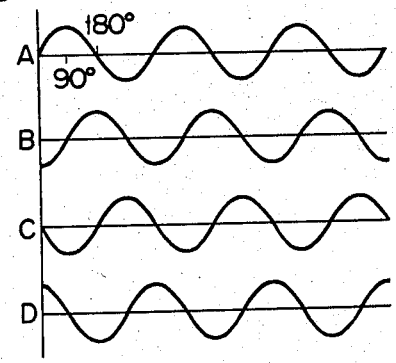
FIG. 3B shows waveforms of drive voltages applied to the display cell.

In the most desirable phase relationship of the AC driving voltages A, B, C and D applied to the display cell of FIG. 1, these voltages A, B, C and D are sequentially phase shifted by 90° as shown in FIG. 3B. Consequently, the voltages A and C supplied to the first interdigital electrode 12 are 180° out of phase with each other, while the voltages B and D supplied to the second interdigital electrode 22 are 180° out of phase with each other.

It will be evident that, when the AC driving voltages A, B, C and D having such a phase relation as shown in FIG. 3B are applied to the first and second interdigital electrodes 12 and 22, such a rotating electric field as indicated by an arrow in FIG. 3A is created in each space surrounded by the intersecting electrode fingers of the first and second interdigital electrodes. By the rotating electric field, liquid crystal molecules are violently rotated or perturbed to produce a light scattering.

As a liquid crystal material any of a nematic liquid crystal and a nematiccholesteric mixed liquid crystal may be used. When the glass surface is so treated that liquid crystal molecules are aligned, in absence of electric field, vertically or horizontally to the glass surface, a high contrast can be obtained.

Figure 4:
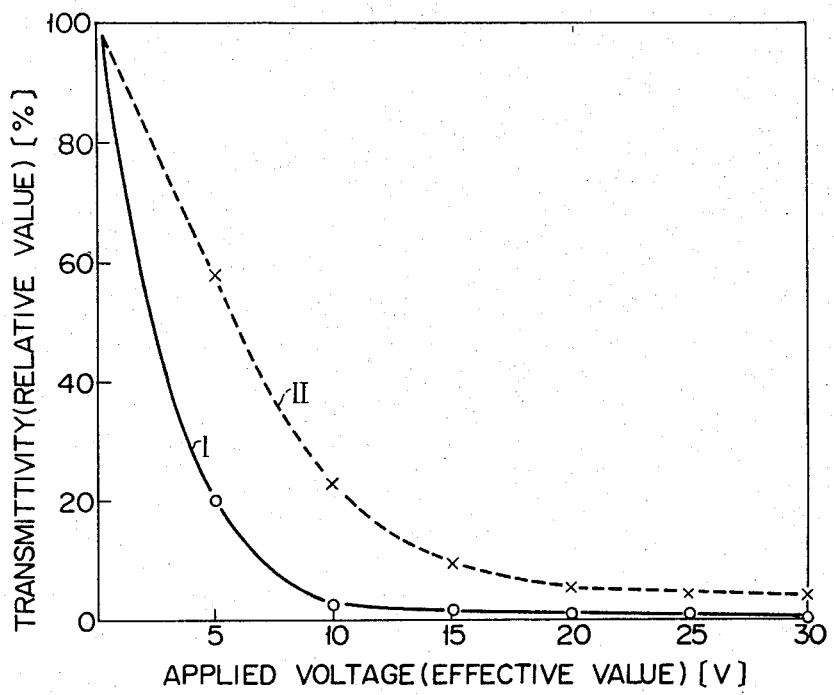
FIGS. 4 to 7 show characteristic curves between the display device according to this invention and a conventional display device.

Use was made as a liquid crystal of a MBBA (4'-methoxylbenzylidene-4-n-butylaniline)-EBBA (4'-ethoxybenzylidene-4n-butylaniline) mixed liquid crystal and a liquid crystal display cell was formed by treating a glass surface with lecithin so that, in absence of electric field, liquid crystal molecules are aligned substantially vertically to the glass surface. An experiment was conducted with respect to a relation between applied voltage and light transmittivity, the result of which is shown in FIG. 4. In this figure, the ordinate indicates relative values obtained when a light transmittivity during the absence of electric field is 100%, while the abscissa indicates the effective voltage values of applied AC signal. A curve I shows the characteristic of the display cell as obtained when AC voltages A, B, C and D which are sequentially displaced in phase by 90° are applied to supply terminals 17, 27, 18 and 28, respectively. As will be evident from the curve I, since the transmittivity when the applied voltage is 30V isabout 0.12%, it will be understood that a contrast of 100/0.12 ≑ 800, i.e. about 800 : 1, can be attained by controlling the 30V voltage in an onoff fashion. A curve II shows the characteristic of a conventional display cell adapted to apply AC signals of the same phase to terminals 17 and 27 and AC signals of the same phase to terminals 18 and 28. As will be apparent from the curve II, since the tansmittivity when the applied voltage is 30V is about 30%, a contrast is about 30 : 1. From the curves I and II it will be understood that with respect to the other voltage values the display cell according to this invention is markedly improved as compared with the conventional display cell.

Figure 5:
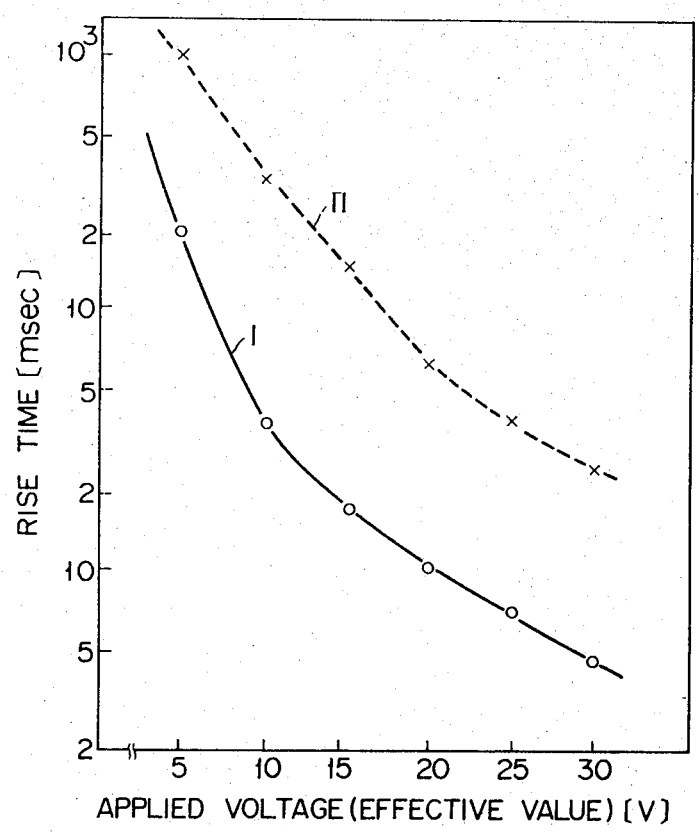

Even with respect to a response, the display cell according to this invention is improved as compared with the conventional display cell. FIG. 5 shows characteristic curves representative of a relation between applied voltage and rise time i.e. a time required for a scattering percent to increase from 10% to 90%. In the figure, a curve I shows the characteristic of the display cell according to this invention, while a curve II shows the characteristic of the conventional display cell. As will be appreciated, the rise time of the display cell according to this invention is prominently shortened as compared with that of the conventional display cell.

Figure 6:
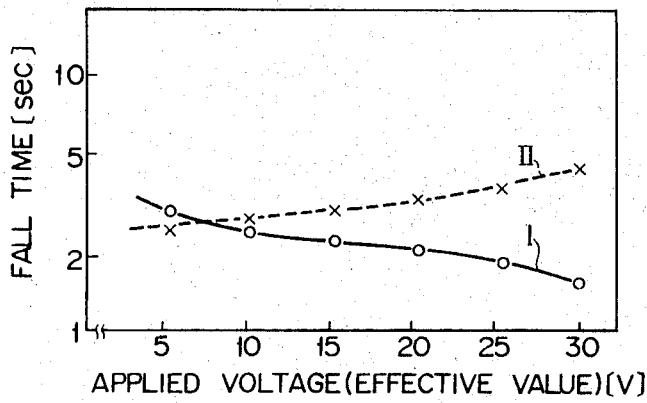

FIG. 6 shows characteristic curves representing a relation between applied voltage and fall time i.e. a time required for a scattering percent to decrease from 90% to 10%. The voltage plotted as an abscissa is applied voltage before the power source is turned off. A curve I shows the characteristic of the display cell according to this invention, while a curve II shows the characteristic of the conventional display cell.

Figure 7:
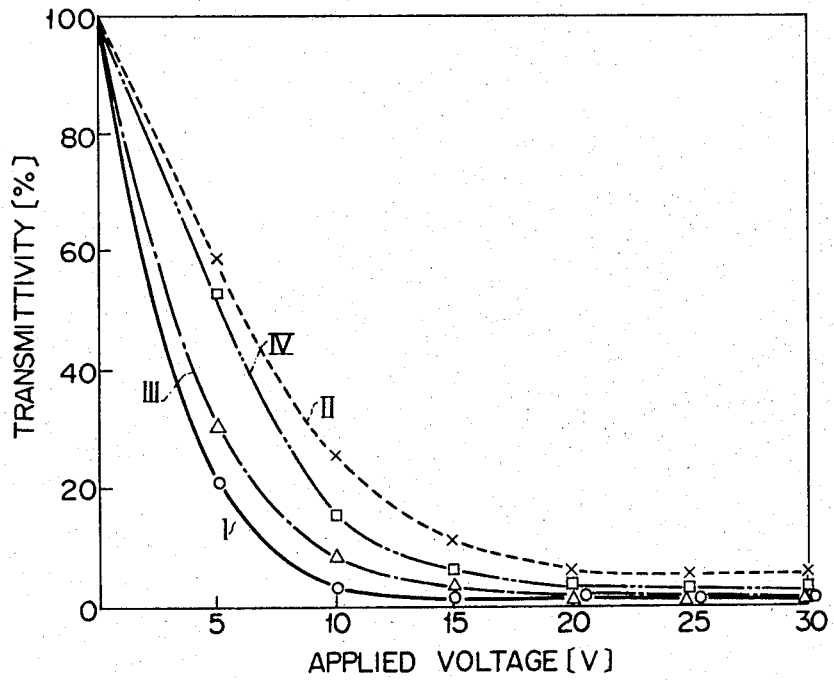

In FIG. 7, curves I and II are identical to those shown in FIG. 4. A curve III shows the characteristic of the display cell as obtained when the terminal 28 of FIG. 1 is grounded and voltages A, B and C as shown in FIG. 3B are applied to the other terminals 17, 27 and 18, respectively. A curve IV shows the characteristic of the display cell as obtained when terminals 18 and 28 are grounded and voltages A and B phase shifted 90° from each other are applied to terminals 17 and 27, respectively. As will be appreciated from FIG. 7, even when AC signals out of phase with each other are not applied to the terminals 17, 27, 18 and 28, the display cell according to this invention presents an excellent contrast as compared with the conventional display cell.

FIG. 7 shows that, even under the same applied voltage, a desired medium contrast display can be effected by suitably selecting a voltage applying method. This also means that a medium contrast display can also be effected by suitably varying the phase difference of voltages applied to the electrodes. When, for example, AC voltages to be applied to the adjacent two of the supply terminals 17, 27, 18 and 28 are varied in a range of 0°–90°, any medium contrast display can be obtained in a range of maximum and minimum contrasts obtained when the phase difference is 90° and 0°, respectively. It will be evident that the above-mentioned effect is obtained by causing the phase of the AC voltage applied to at least one of the supply terminals 17, 27, 18 and 28 to be made different from the phase of the AC voltage applied to the other supply terminal or terminals.

With the conventional liquid crystal display device, a medium contrast display is effected by varying the magnitude of applied voltage. In that portion of the applied voltage-transmittivity curve which shows an abrupt Y characteristic, however, a minute change in applied voltage value emerges as a greater transmittivity change. It is therefore difficult to effect a medium contrast display. A great advantage of this invention resides in that a medium contrast display can be effected by the phase difference of driving voltages, not by the magnitude of applied voltages.

Figure 8:
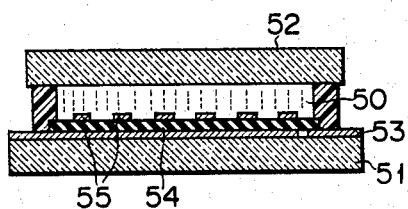
FIG. 8 is a side view in cross section of a display cell according to another embodiment of this invention.

The liquid crystal display cell according to this invention is not restricted to the construction is shown in FIG. 2. As shown in FIG. 8, for example, a liquid crystal display cell may be fabricated by forming a first interdigital electrode 53 on one (in this case, 51) of a pair of glass substrates 51 and 52 between which a liquid crystal material 50 is sandwiched, and then forming a second interdigital electrode 55 on an insulating film 54, such as silicon monoxide, silicon dioxide, yttrium oxide etc., which is disposed, through the first interdigital electrode 53, on the glass substrate 51. In this structure, the fingers of the first and second interdigital electrodes 53 and 55 intersect with respect to each other as in the case of FIG. 1.

Figure 9:
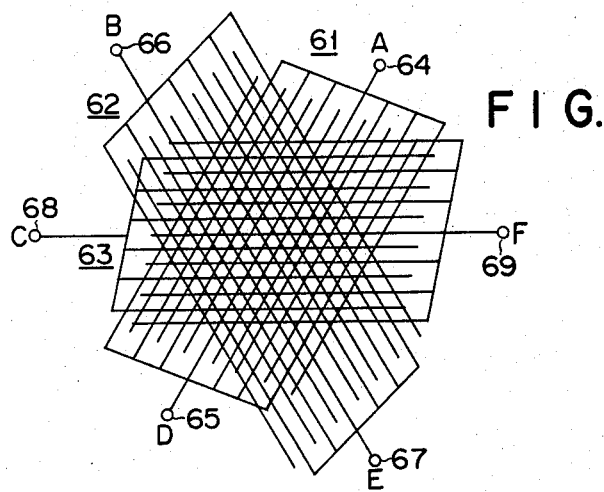
FIG. 9 is a view showing an electrode arrangement according to a further embodiment of this invention.
Figure 11:
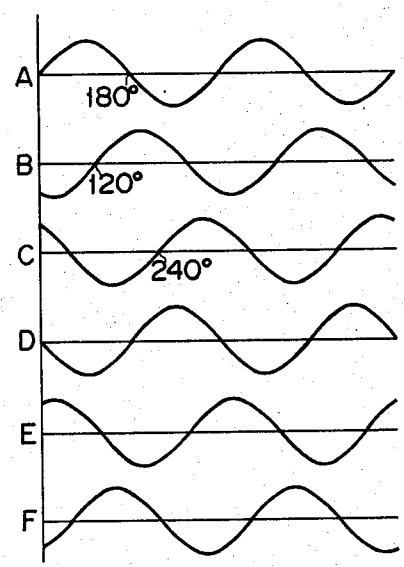
FIG. 11 shows the waveforms of driving voltages applied in association with the electrode arrangement of FIG. 9.

Though, with the above-mentioned embodiments, a pair of interdigital electrodes are used, this invention is not restricted to such liquid crystal display cell. As shown in FIG. 9, for example, the fingers of three interdigital electrodes 61, 62 and 63 may be so arranged that they intersect at an angle of 120° or 60° to one another. In this case, AC voltages sequentially phase-shifted by 120° as shown in FIG. 11 i.e. three-phase AC voltages A, B and C are applied to the respective terminals 64, 66 and 68 of the interdigital electrodes 61, 62 and 63, while AC voltages D, E and F phase-shifted 180° from the AC voltages A, B and C, respectively, are applied to the respective opposite terminals 64, 66 and 68 of the interdigital electrodes 61, 62 and 63. Under these voltage conditions a most efficient display can be effected. From the above-mentioned embodiment it will be understood that in an attempt to effect a medium contrast display the phase difference between the AC voltages may be positively varied.

Figure 10:
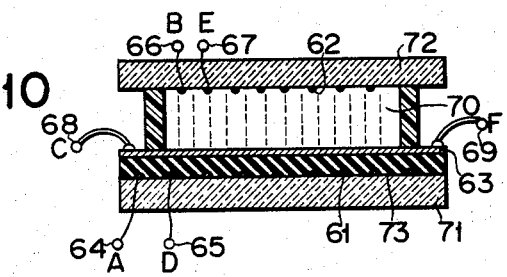
FIG. 10 is a side view in cross section of a display cell having the electrode arrangement of FIG. 9.

A construction as shown in FIG. 10 is considered advantageous in realizing the electrode arrangement shown in FIG. 9. In the construction shown in FIG. 10 a first interdigital electrode 61 is formed on one (in this case, 71) of a pair of glass substrates 71 and 72 between which a liquid crystal material 70 is sandwiched. A second interdigital electrode 63 is formed, through an insulating layer 73, on the interdigital electrode 61 and a third interdigital electrode 62 is formed on the other glass substrate 72.

Figure 12:
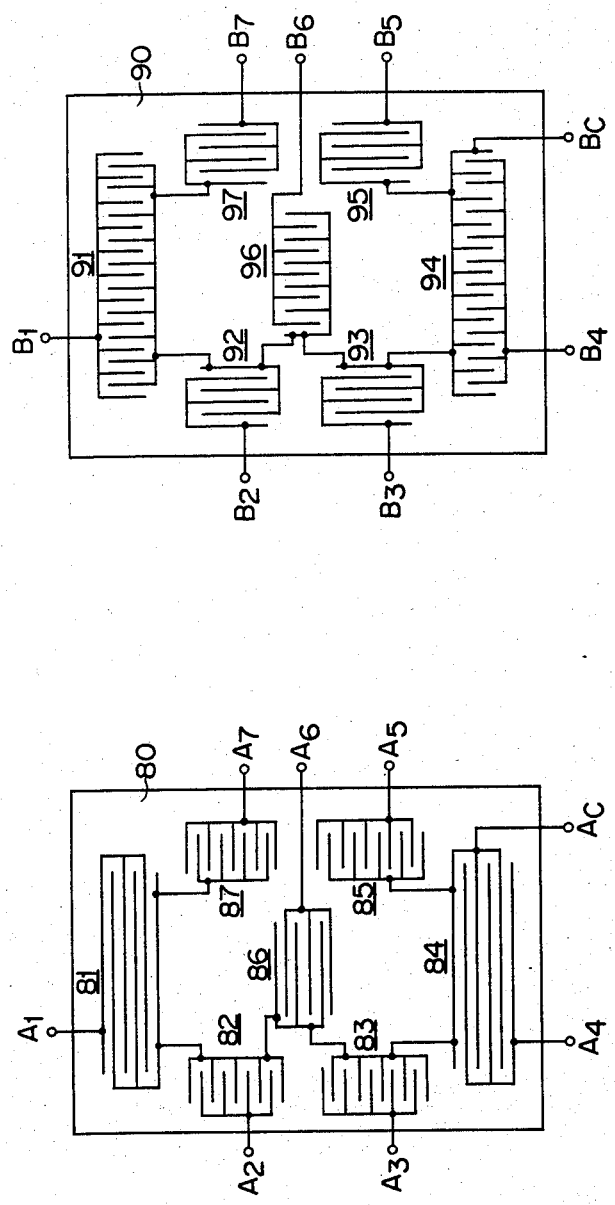
FIGS. 12A and 12B show one example of an electrode pattern used in a digit display device according to this invention.

This invention can be applied to a 7-element digital display unit. In this case, a first set of 7 interdigital electrodes 81 to 87 corresponding to 7 electrode elements is formed on one substrate 80 as shown in FIG. 12A. One electrode of each of the interdigital electrodes is connected to a common terminal AC, while the opposite electrodes of the interdigital electrodes 81 to 87 are connected to terminals A1 to A7 respectively. A second set of 7 interdigital electrodes 91 to 97 corresponding to 7 electrode elements may be formed on the other substrate 90 as shown in FIG. 12B. One electrode of each of the interdigital electrodes is connected to a common terminal BC, while the opposite electrodes of the interdigital electrodes 91 to 97 are connected to the terminals B1 to B7 respectively. These interdigital electrodes 81 to 87 and 91 to 97 are so formed on the respective substrates 80 and 90 that, when one substrate is disposed on the other substrate with a liquid crystal material sandwiched therebetween, the corresponding interdigital electrodes of the first and second sets face each other and the fingers thereof intersect at a predetermined angle to each other.

Figure 13:
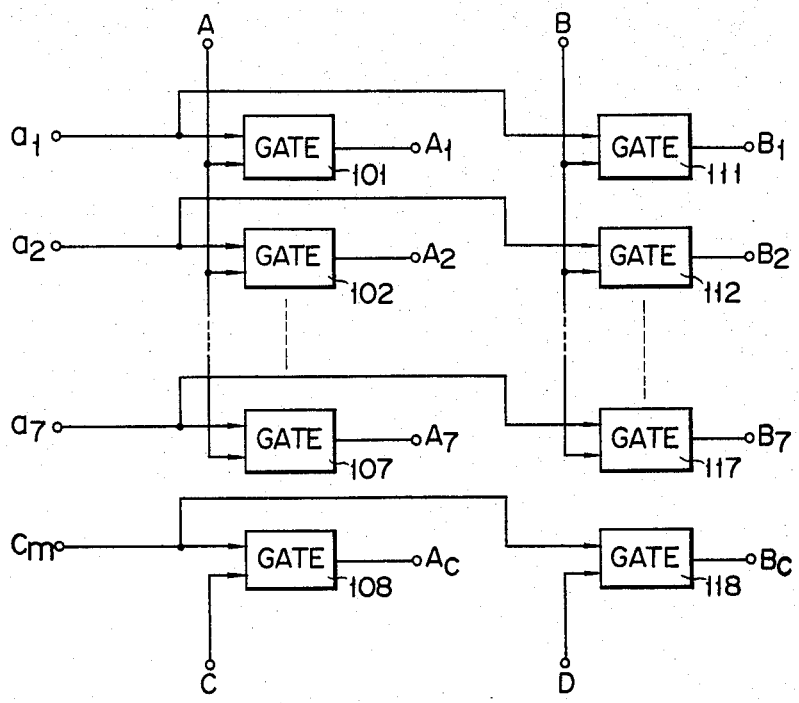
FIG. 13 is a control circuit diagram for the digit display device of FIGS. 12A and 12B.

FIG. 13 shows one example of a control circuit for the above-mentioned 7-element digital display device. Selection signals $a1$ to $a7$, for example, from a digit decoder are coupled to first input terminals, respectively, of gates 101 to 107, while AC signal A as shown in FIG. 3B is coupled to a second input terminal of each of the gates 101 to 107. The selection signals $a1$ to $a7$ are coupled to first input terminals, respectively, of gates 111 to 117, while AC signal B as shown in FIG. 3B is coupled to a second input terminal of each of the gates 111 to 117. The outputs of the gates 101 to 107 are coupled to terminals A1 to A7, respectively, and the outputs of the gates 111 to 117 are coupled to terminals B1 to B7, respectively. A common selection signal Cm is coupled to a first input terminal of a gate 108, while AC signal C as shown in FIG. 3B is coupled to a second input signal of the gate 108. The common selection signal Cm is also coupled to a first input terminal of a gate 118 and AC signal D as shown in FIG. 3B is coupled to a second input terminal of the gate 118. The outputs of the gates 108 and 118 are coupled to terminals AC and BC, respectively. When the selection signal is applied to the first input terminal of the gate, the gate is enabled to cause AC signal applied to the second input terminal thereof to develop at the output terminal. The common selection signal Cm is present when at least one of the selection signals $a1$ to $a7$ is present. Consequently, the common selection signal Cm may be the output of OR gate to which the selection signals $a1$ to $a7$ are supplied.

When, for example, the selection signals $a1$, $a3$, $a4$, $a6$ and $a7$ appear, AC signal A as shown in FIG. 3B is applied to the terminals A1, A3, A4, A6 and A7 shown in FIG. 12A; AC signal C as shown in FIG. 3B is applied to the common terminal AC; AC signal B as shown in FIG. 3B is applied to the terminals B1, B3, B4, B6 and B7 shown in FIG. 12B; and AC signal D as shown in FIG. 3B is applied to the common terminal BC. As a result, a digit 2 is represented. Even with such digital display device, a digital display can be effected with a desired contrast by suitably selecting a voltage supply to each terminal or by suitably selecting the phase difference of AC signals. With a digital display device adapted to handle multiple digits, what is called "a dynamic drive display" can be effected by sequentially switching one digit display to another using the rapid rise characteristic of the liquid crystal display device according to this invention.

Figure 14:
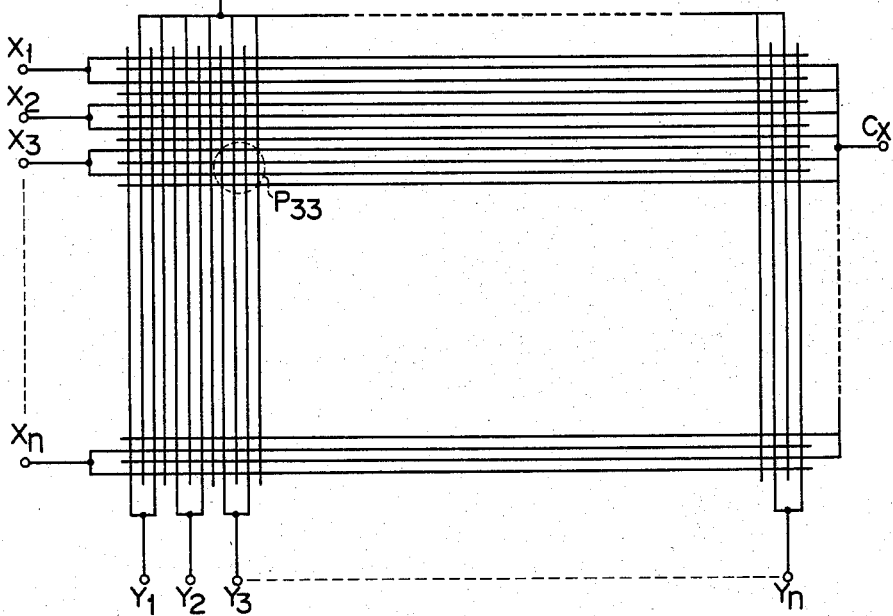
FIG. 14 is a schematic view showing one form of a matrix display device according to this invention.

There will now be explained by reference to FIG. 14 the case where this invention is applied to an X-Y matrix display. In the figure, an electrode CY and electrodes Y1, Y2 ... Yn are on the same plane, and an electrode CX and electrodes X1, X2 ... Xn are arranged in a manner to intersect at a right angle to the electrodes CY and Y1, Y2 ... Yn. In this case, the desired portion or portions of a liquid crystal can be scattered by normally applying voltage signals C, D as shown in FIG. 3B to the electrodes CX and CY and selectively applying voltages to the other electrodes of the X and Y arrays. If, for example, voltage signals A, B as shown in FIG. 3B are applied to the electrodes X3 and Y3, a liquid crystal portion corresponding to a picture element P33 as enclosed by broken lines in FIG. 14 can be scattered, thereby effecting a display. A picture image can be so displayed by selectively driving each picture element. It is needless to say that a medium contrast display can also be effected by suitably selecting the magnitude, phase difference etc. of voltages to be applied to the electrodes. In such a matrix display, however, a cross-talk noise or cross effect presents problems. Namely, where, for example, the picture element P33 is displayed, "half selection" is made based on the application of voltages to the electrodes X3 and Y3, sometimes causing the contrast of a picture image to be affected. According to this invention, however, since a rotating electric field is applied to the picture element P33 and an electric field is applied as in the prior art to those matrix portions, other than the portion P33, along the electrodes X3 andn Y3, a rise time greatly differs between the portion P33 and those portions, other than the portion P33. Consequently, a suitable choice of a scanning speed permits scattering to occur at only the portion P33. It is therefore possible to eliminate a cross-talk. If the scanning speed can not be suitably selected, any influence of cross-talk noises on an image quality can be eliminated by the joint use of the known two-frequency superposing method, ⅓ biasing method etc.

What we claim is:

1. A liquid crystal display device comprising first and second substrates, a first interdigital electrode disposed on said first substrate and consisting of first and second electrodes having a plurality of electrode fingers, the electrode fingers of said first and second electrodes being arranged in an interdigital fashion on the same plane; a second interdigital electrode disposed on one of said first and second substrates and consisting of third and fourth electrodes having a plurality of electrode fingers, the electrode fingers of said third and fourth electrodes being arranged in an interdigital fashion on the same plane, and said first and second interdigital electrodes being arranged opposite to each other so that the electrode fingers thereof intersect at a predetermined angle to each other; a liquid crystal material disposed between said first and second substrates; and drive voltage source means for supplying an AC drive voltage between said first and second electrodes of said first interdigital electrode and between said third and fourth electrodes of said second interdigital electrode wherein said AC drive voltage source means is adapted to apply to at least said first and third electrodes of said first and second interdigital electrodes respectively, AC drive voltages having a predetermined phase difference therebetween so as to thereby produce rotating electric fields to influence the liquid crystal molecules.

2. A liquid crystal display device mounting to claim 1 in which said phase difference is substantially 90°.

3. A liquid crystal display device according to claim 1 in which said AC drive voltage source means is adapted to apply to said first and second electrodes of said first interdigital electrode AC voltages 180° out of phase with each other and to said third and fourth electrodes of said second interdigital electrode AC voltages 180° out of phase with each other.

4. A liquid crystal display device according to claim 1 in which there is a further provided a third interdigital electrode consisting of fifth and sixth electrodes having a plurality of electrode fingers, the electrode fingers of said fifth and sixth electrodes being arranged in an interdigital fashion on the same plane, and said electrode fingers of said third interdigital electrode intersecting at a predetermined angle to the respective fingers of said first and second interdigital electrodes; and said drive voltage source means is adapted to apply to at least said fifth electrode an AC voltage having a predetermined phase difference with respect to the AC voltages applied to said first and third electrodes.

5. A liquid crystal display device according to claim 4 in which said predetermined phase difference is substantially 120°.

6. A liquid crystal display device according to claim 4 in which the angle at which electrode fingers of said first, second and third interdigital electrodes intersect with respect to each other is substantially 120°.

7. A liquid crystal display device according to claim 4 in which said drive voltage source means is adapted to apply to said first and second electrodes of said first interdigital electrode AC voltages 180° out of phase with each other, to said third and fourth electrodes of said second interdigital electrodes AC voltages 180° out of phase with each other and to said fifth and sixth electrodes of said third interdigital electrode AC voltages 180° out of phase with each other.

8. A liquid crystal display device according to claim 1 in which said second interdigital electrode is disposed on said second substrate.

9. A liquid crystal display device according to claim 1 in which said second interdigital electrode is disposed, through an insulating film, on said first substrate on which said first interditigal electrode is disposed.

10. A liquid crystal display device according to claim 1 in which said first interdigital electrode is provided seven in number to constitute a first set of interdigital electrodes, said interdigital electrodes of said first set being arranged on the same plane in such a pattern as to constitute a digit when selectively combined and said second electrodes of said interdigital electrodes of said first set being connected in common; and said second interdigital electrode is provided seven in number to constitute a second set of interdigital electrodes, said interdigital electrodes of said second set being so arranged on the same plane as to oppositely face in one-to-one correspondence said innterdigital electrodes of said first set, and said fourth electrodes of said interdigital electrodes of said second set being connected in common; and said drive voltage source means is adapted to selectively apply said AC drive voltages to at least first and third electrodes of corresponding interdigital electrodes of said first and second sets in response to selection signals.

* * * * *